United States Patent
Giletta

(10) Patent No.: US 8,308,080 B2
(45) Date of Patent: Nov. 13, 2012

(54) SPREADER UNIT WITH A SUPPORTING ARM FOR DEICER SPREADER ASSEMBLIES

(75) Inventor: Enzo Giletta, Revello (IT)

(73) Assignee: Giletta S.p.A. (IT)

(*) Notice: Subject to any disclaimer, the term of this patent is extended or adjusted under 35 U.S.C. 154(b) by 697 days.

(21) Appl. No.: 12/135,171

(22) Filed: Jun. 7, 2008

(65) Prior Publication Data

US 2009/0014563 A1  Jan. 15, 2009

(30) Foreign Application Priority Data

Jun. 8, 2007 (IT) .................. TO2007A0409

(51) Int. Cl.
  B05B 1/20 (2006.01)
  B05B 3/18 (2006.01)
  B05B 1/24 (2006.01)
(52) U.S. Cl. ......... 239/165; 239/723; 239/130; 239/754
(58) Field of Classification Search .......... 239/650–689, 239/130, 146, 147, 159, 172, 176, 165, 145.1, 239/302, 201, 722, 723, 754, 742; 138/114, 138/115–117, 119; 15/144.4; 285/145.1
See application file for complete search history.

(56) References Cited

U.S. PATENT DOCUMENTS

| 1,360,382 | A | * | 11/1920 | Edwards | 285/302 |
| 2,064,278 | A | * | 12/1936 | Tappe | 169/25 |
| 2,331,373 | A | | 10/1943 | Campbell | |
| 2,695,307 | A | * | 11/1954 | Guillissen et al. | 556/453 |
| 2,965,307 | A | * | 12/1960 | High | 239/273 |
| 3,266,728 | A | * | 8/1966 | Hallberg | 239/155 |
| 3,897,263 | A | * | 7/1975 | Davis et al. | 134/45 |
| 4,272,023 | A | * | 6/1981 | Georgiev et al. | 239/204 |
| 4,805,653 | A | * | 2/1989 | Krajicek et al. | 134/166 C |
| 5,799,835 | A | * | 9/1998 | Gobbel | 222/174 |
| 6,085,993 | A | * | 7/2000 | Beggs | 239/166 |
| 6,491,234 | B2 | * | 12/2002 | Beggs | 239/166 |
| 2006/0175440 | A1 | * | 8/2006 | Gunlogson et al. | 239/722 |

FOREIGN PATENT DOCUMENTS

| DE | 19749674 | 5/1999 |
| EP | 0118366 | 9/1984 |
| WO | WO02072275 | 9/2002 |

OTHER PUBLICATIONS

EP Search Report.

* cited by examiner

Primary Examiner — Len Tran
Assistant Examiner — Justin Jonaitis
(74) Attorney, Agent, or Firm — The Belles Group, P.C.

(57) ABSTRACT

A spreader unit, for spreading deicer on a pavement, has at least one supporting arm having a casing connected to a rigid structure of the unit, a sliding member connected telescopically to the casing, and at least one telescopic pipe for the deicer and defining a connecting port connectable to a spreader assembly for spreading the deicer.

18 Claims, 3 Drawing Sheets

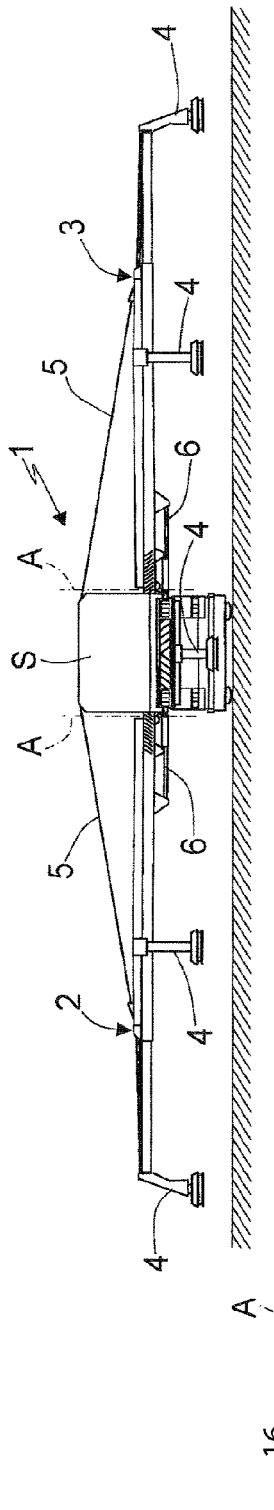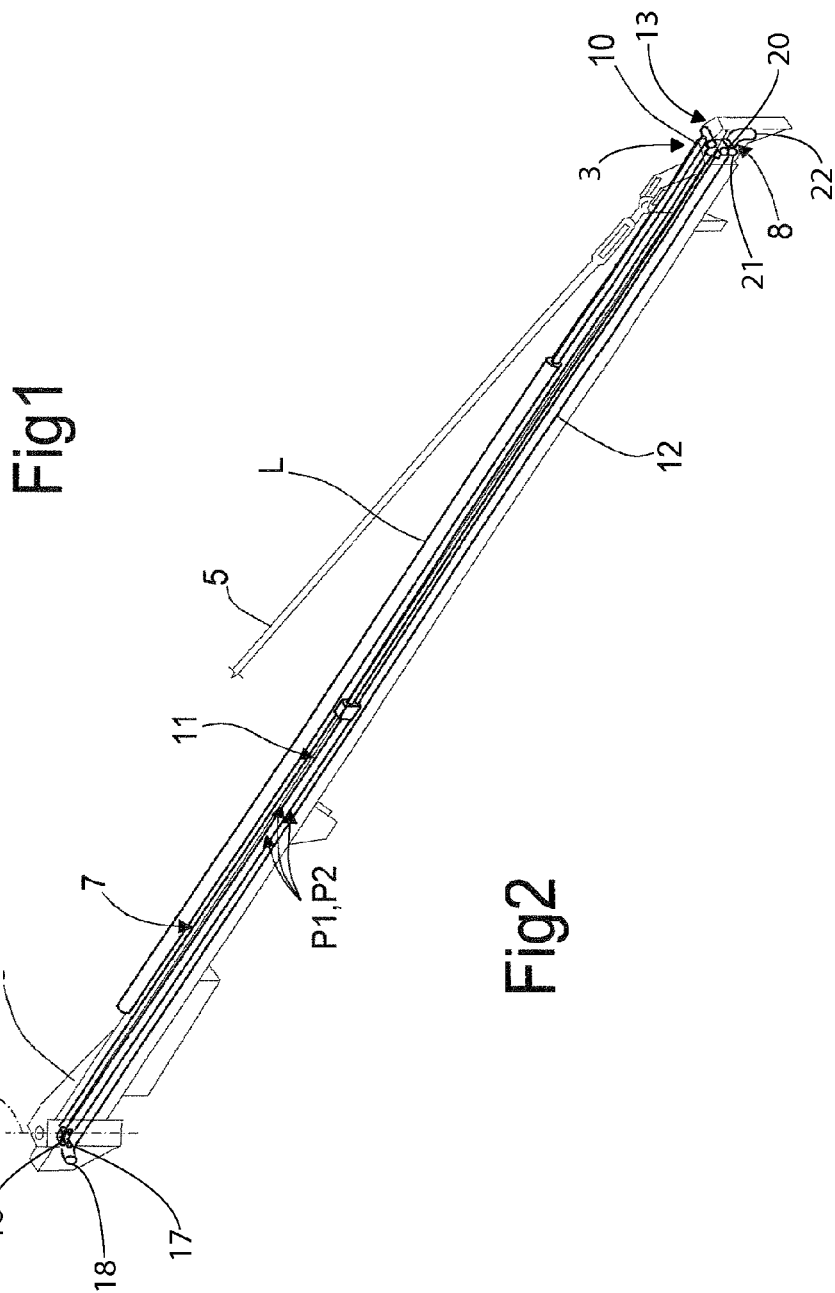

SPREADER UNIT WITH A SUPPORTING ARM FOR DEICER SPREADER ASSEMBLIES

This Non-provisional application claims priority under 35 U.S.C. §119(a) on Italian Patent Application No. TO2007A 000409 filed on Jun. 8, 2007, the entire contents of which are hereby incorporated by reference.

The present invention relates to a spreader unit fitted to an industrial vehicle and having a supporting arm for deicer spreader assemblies, e.g. for spreading airport pavements with deicer fluid.

BACKGROUND OF THE INVENTION

Airport pavements normally comprise the runways, taxiways, and the terminal area, and cover an extensive area that must be spread with deicer fluid as fast as possible to avoid delays in air traffic departures and arrivals.

SUMMARY OF THE INVENTION

It is an object of the present invention to provide a spreader unit having a supporting arm for spreader assemblies, and designed to spread deicer fluid effectively and rapidly over extensive areas.

According to the present invention, there is provided a spreader unit with a supporting arm as claimed in the attached Claims.

BRIEF DESCRIPTION OF THE DRAWINGS

A preferred, non-limiting embodiment of the present invention will be described by way of example with reference to the accompanying drawings, in which:

FIG. 1 shows a rear view of a spreader vehicle comprising two supporting arms in accordance with the present invention;

FIG. 2 shows a view in perspective of a supporting arm in accordance with the present invention;

DETAILED DESCRIPTION OF THE INVENTION

Figure 3:
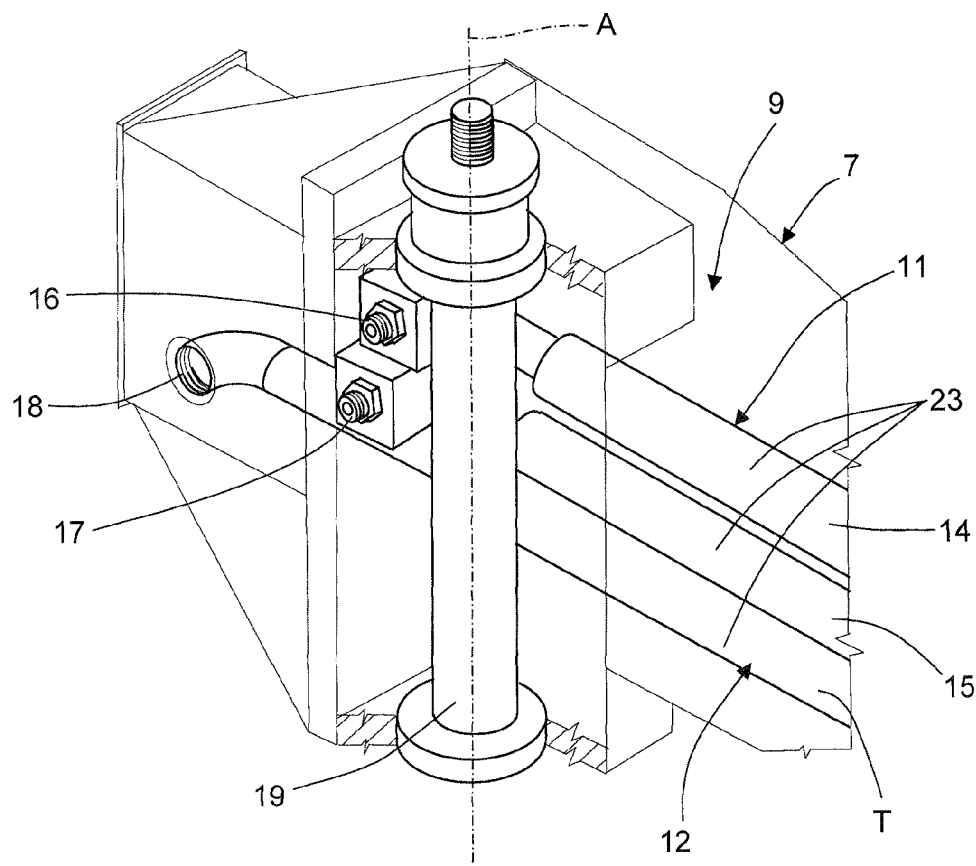
FIGS. 3 and 4 show partial views in perspective of respective end portions of the FIG. 2 supporting arm.

Number 1 in FIG. 1 indicates a vehicle fitted with a spreader unit S for transporting and spreading deicer fluid on a pavement. Deicer fluid may vary in viscosity, depending on its composition, and is contained in a tank on spreader unit S.

Spreader unit S also comprises two supporting arms 2, 3; a number of spreader assemblies 4 connected directly to supporting arms 2, 3 and optionally to a rigid structure of spreader unit S; and a pump (not shown) for pumping the deicer fluid to the spreader assemblies.

Each spreader assembly 4 preferably comprises a bladed rotary disk onto which the deicer fluid is fed; and the rotary disk blades spread the deicer fluid centrifugally over a work area diverging from the rotary disk.

Each supporting arm 2, 3 is hinged about a vertical axis A to the rigid structure of spreader unit S, and is sustained substantially perpendicular to axis A by respective ties 5 adjustable manually in length and fixed to the rigid structure.

Arms 2, 3 are movable by linear actuators 6 between a work position (FIG. 1), and a rest position in which they are substantially parallel to the sides of vehicle 1.

Each arm 2, 3 comprises a high-pressure hydraulic line 11 for transferring mechanical power, and a low-pressure fluid line 12 for transporting the deicer fluid. Each arm 2, 3 has a hollow, preferably closed section, and lines 11, 12 are housed inside relative arm 2, 3 for shock protection.

Each arm 2, 3 (FIG. 2) comprises a tubular casing 7 connected directly to respective tie 5; and a sliding member 8 movable telescopically inside tubular casing 7.

Each arm 2, 3 also comprises a linear actuator L connected between tubular casing 7 and sliding member 8 to control the telescopic movement of sliding member 8 between an extracted position (FIG. 1) and a withdrawn position (FIG. 2).

Tubular casing 7 has a rectangular cross section, and comprises an end portion 9 defining axis A as described in detail below; and an end portion 10 axially opposite end portion 9 and defining an opening for extraction of sliding member 8.

Tubular casing 7 is designed to directly support a spreader assembly 4, and lines 11 and 12 have respective ports P1, P2 (shown schematically) connected to a relative spreader assembly 4 to respectively drive the rotary spreader disk by means of a rotary hydraulic motor on spreader assembly 4, and to feed the deicer fluid to the bladed disk.

Lines 11, 12 also have a second group of ports connected parallel to ports P1, P2 and located on a free end portion 13 of sliding member 8, as described in more detail below.

More specifically (FIG. 3), line 11 comprises a feed pipe 14 and a drain pipe 15 for controlling the hydraulic motors of spreader assemblies 4 connected to supporting arm 2, 3. Feed pipe 14 and drain pipe 15 have an inlet port 16 and outlet port 17 respectively, and inlet port 16 is connected to a hydraulic pump of spreader unit S.

Line 12 comprises a telescopic pipe T, preferably the same as pipes 14, 15, and is supplied through an inlet port 18 by the deicer fluid pump of spreader unit S.

Ports 16, 17, 18 define a third group of ports of lines 11, 12, and are located on end portion 9, which also supports a pin 19 connected rigidly to the rigid structure of spreader unit S and rotating with respect to tubular casing 7 by means of two bearings to define axis A.

Figure 4:
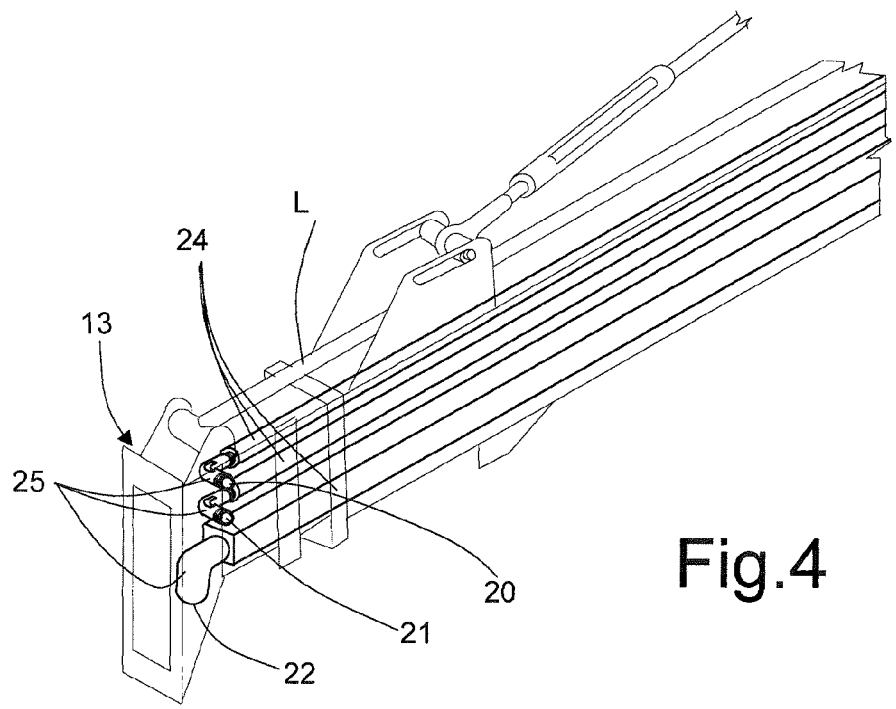

FIG. 4 shows the free end portion 13 of sliding member 8, and in particular an outlet port 20 of feed pipe 14, an inlet port 21 of drain pipe 15, and an outlet port 22 of line 12, which ports define the second group of ports of lines 11, 12.

A spreader assembly 4 is connected mechanically to free end portion 13 by a plate, and ports 20, 21, 22 are connected to spreader assembly 4 by respective hoses (not shown).

To allow movement of sliding member 8, pipes 14, 15 and line 12 are rigid and telescopic.

More specifically, each pipe 14, 15, T has a circular cross section, and comprises a sleeve 23 connected rigidly to tubular casing 7 and defining inlet port 16 and outlet port 17 respectively.

Each pipe 14, 15, T also comprises a sliding member 24 movable in fluidtight manner inside sleeve 23.

Sliding member 24 of each pipe 14, 15, T comprises an end portion connected to an elbow joint 25, which defines outlet port 20 or inlet portion 21, and is connected rigidly to free end portion 13.

Figure 5:
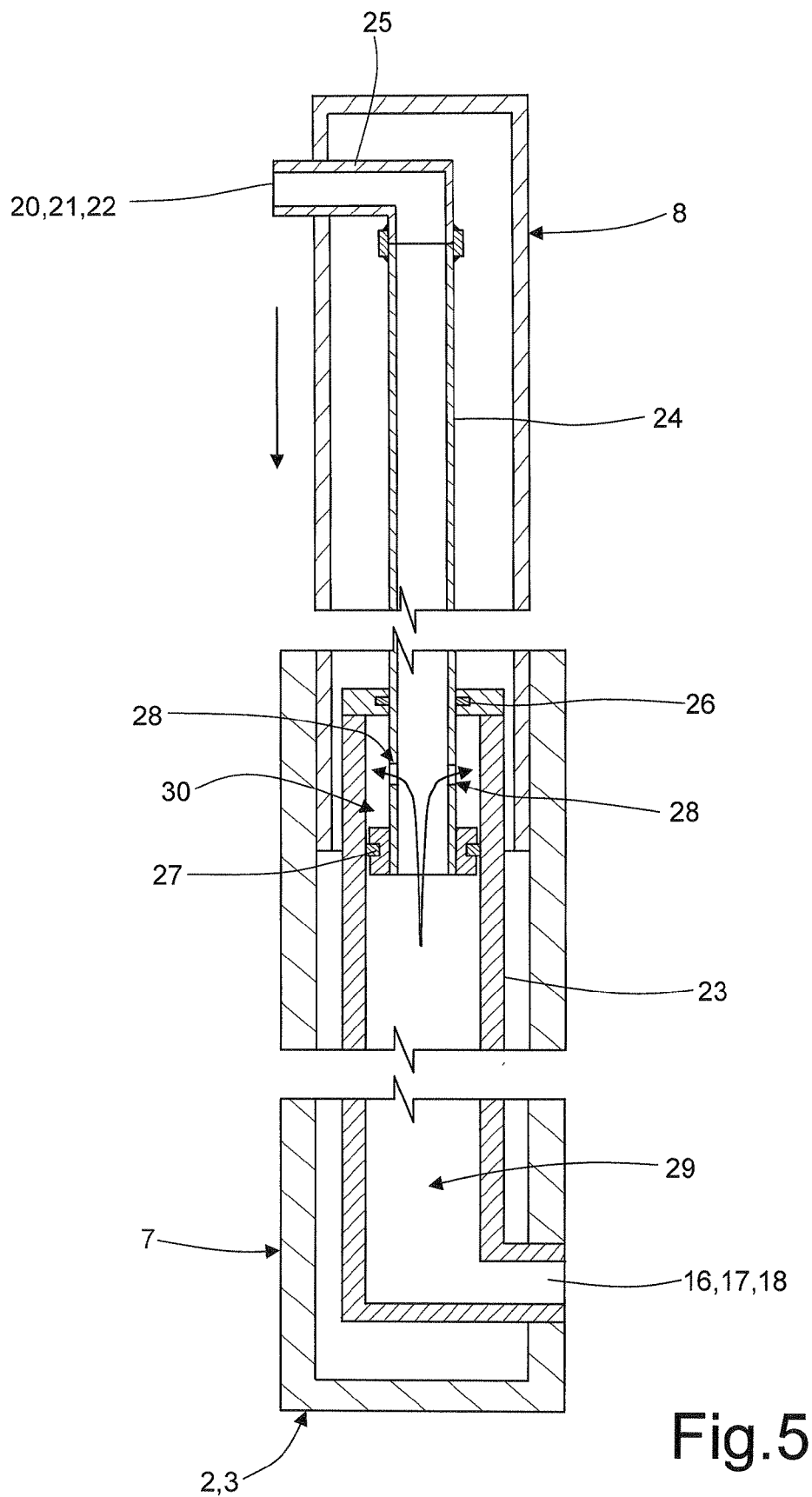
FIG. 5 shows a schematic section of a detail of the FIG. 1 supporting arms.

FIG. 5 shows a section of a preferred embodiment of pipes 14, 15, T.

Sleeve 23 comprises a dynamic seal 26 which cooperates with the outer surface of sliding member 24 to ensure adequate fluidtight sealing.

Sliding member 24 is connected to a second dynamic seal 27 located on the opposite axial side with respect to elbow joint 25, and which cooperates with the inner surface of sleeve 23 to guide sliding member 24 in a straight direction.

Sliding member 24 defines a number of radial holes 28 located between dynamic seal 27 and dynamic seal 26 to connect a chamber 29, defined inside sleeve 23, between ports 16, 17, 18 and dynamic seal 27, to a chamber 30 defined inside sleeve 23, between dynamic seal 26 and dynamic seal 27.

Spreader unit S operates as follows.

When spreader assemblies 4 of vehicle 1 are off, e.g. when vehicle 1 is parked, arms 2, 3 are maintained in the rest position by linear actuators 6, and vehicle 1 occupies substantially the same space as a normal spreader vehicle.

When spreader assemblies 4 are to be turned on, arms 2, 3 are moved into the work position by linear actuators 6, and sliding members 8 are extracted by linear actuators L (FIG. 1).

As sliding members 8 are extracted, linear actuators L extract sliding members 24 by means of respective elbow joints 25. The hydraulic fluid powers the rotary motors connected to the bladed disks and circulates along pipes 14 and 15, while the deicer fluid flows to spreader assemblies 4 connected in parallel to one another by lines 11 and 12.

In this position, vehicle 1 spreads the deicer fluid to a width substantially defined by the total ground width of the work areas of spreader assemblies 4.

When arms 2, 3 are withdrawn by means of respective linear actuators L, holes 28 allow hydraulic fluid flow between chamber 29 and chamber 30 to ensure rapid movement of sliding member 24.

Spreader unit S according to the present invention has the following advantages.

The telescopic design of fluid lines 11, 12 and of the structural part comprising tubular casing 7 and sliding member 8 enables a number of spreader assemblies 4 to be supported in a compact configuration that is easy to produce and maintain.

An industrial vehicle with compact lateral arms can be certified for on-road travel, unlike vehicles with bulky arms, that are too wide and are only allowed to circulate within the airport.

Telescopic arms are extremely lightweight, and can be maintained in the projecting extracted position by means of simple connecting devices.

As a result of the reduction in weight, more deicer fluid can be carried in the tank of spreader unit S.

Holes 28 provide for faster movement of sliding member 8.

Clearly, changes may be made to spreader unit S as described and illustrated herein without, however, departing from the protective scope of the present invention as defined in the accompanying Claims.

More specifically, lines 11, 12 may be multistage lines and comprise a number of telescopic sliding members. In which case, holes 28 are designed to connect chambers 29, 30 as the telescopic members are withdrawn, to speed up operation of arms 2, 3.

Spreader unit S may be either integrated in or removable from vehicle 1. In which latter case, a heavy-duty vehicle may be adapted to spread pavements with deicer fluid.

Alternatively, each spreader assembly 4 may comprise a nozzle bar connected to low-pressure line 12 instead of the hydraulic motor powered bladed disk, and which comprises a number of nozzles for spraying the deicer fluid.

Each nozzle bar is connected by an articulated mechanism to relative arm 2, 3. More specifically, arms 2, 3 have a fixed vertical position, and the articulated mechanism is operated, e.g. by a hydraulic linear actuator, to regulate the distance between the nozzle bar and the pavement. At least in use, the nozzle bar is normally parallel to the pavement.

The invention claimed is:

1. A spreader unit for spreading deicer on a pavement, and comprising:
at least one supporting arm having a casing connected to a rigid structure of said spreader unit, a sliding arm member connected telescopically to said casing, and at least one telescopic pipe for said deicer and defining a connecting port connectable to a spreader assembly for spreading said deicer, wherein said telescopic pipe comprises a sleeve and a sliding pipe member extractable from said sleeve by means of said sliding arm member and defining a pipe connected to said connecting port, characterized in that said telescopic pipe comprises:
first sealing means fixed with respect to said sleeve and cooperating with said sliding pipe member;
second sealing means fixed with respect to said sliding pipe member and cooperating with said sleeve;
an inlet port defined by said sleeve; and
fluidic connecting means for connecting a first chamber, defined between said second sealing means and said inlet port, to a second chamber defined between said first and second sealing means; and
wherein said inlet port and said connecting port are in direct fluid communication by an axial passage of said sliding pipe member.

2. A spreader unit as claimed in claim 1, characterized in that said sliding pipe member is connected to said sliding arm member by a fluidic joint defining said connecting port.

3. A spreader unit as claimed in claim 1, characterized, in that said at least one supporting arm has a hollow cross section; and said telescopic pipe is at least partly housed inside said at least one supporting arm.

4. A spreader unit as claimed in claim 1, characterized by comprising a linear actuator connected between said sliding arm member and said casing to extract said sliding arm member.

5. A spreader unit as claimed in claim 1, characterized in that said at least one supporting arm is hinged to the rigid structure of said spreader unit; and further comprising a tie connected between said supporting arm and said rigid structure.

6. A spreader unit as claimed in claim 1, characterized by comprising at least a second and a third telescopic pipe connectable by respective ports to the spreader assembly.

7. A spreader unit as claimed in claim 1, characterized in that said spreader assembly comprises a nozzle bar connectable to said connecting port.

8. A spreader unit as claimed in claim 1, characterized by comprising a tank for said deicer fluid; and a pump connecting said tank to said connecting port.

9. A vehicle comprising a spreader unit as claimed in claim 1; and at least one spreader assembly connected to said at least one supporting arm and to said telescopic pipe.

10. The spreader unit as claimed in claim 1 wherein said first and second chambers are connected by said fluid connecting means irrespective of relative axial position between said sleeve and said sliding pipe member.

11. The spreader unit as claimed in claim 1 wherein said inlet port forms a passageway into said first chamber, said first chamber further defined by an inner surface of said sleeve.

12. A spreader unit for spreading deicer on a pavement comprising:
at least one telescopic pipe comprising a sleeve and a sliding pipe member extractable from an interior cavity of said sleeve, said sliding pipe member comprising a connecting port connectable to a spreader assembly for spreading said deicer, said connecting port in fluid communication with an interior cavity of said sliding pipe member;

a first seal disposed between an inner surface of said sleeve and an outer surface of said sliding pipe member;

a second seal disposed between said inner surface of said sleeve and said outer surface of said sliding pipe member;

said interior cavity of said sleeve being divided into a first chamber and a second chamber by said second seal, said second chamber defined between said first seal and said second seal and between an outer surface of said sliding pipe member and an inner surface of said sleeve, and said first chamber located on an opposite side of said second seal than said second chamber;

said sleeve comprising an inlet port in said first chamber;

said second chamber being in fluid communication with said interior of said sliding pipe member via one or more passages in said sliding pipe member; and said sliding pipe member comprising an axial passage, said interior cavity of said sliding pipe member being in fluid communication with said first chamber via said axial passage.

13. The spreader unit of claim 12 wherein said sliding pipe member comprises an open end, said open end comprising said axial passage.

14. The spreader unit of claim 12 wherein said second seal is fixed with respect to said sliding pipe member and said first seal is fixed with respect to said sleeve.

15. The spreader unit of claim 13 further comprising:
    at least one supporting arm having a casing connected to a rigid structure of said spreader unit;
    a sliding arm member connected telescopically to said casing; and
    wherein said sliding pipe member is extractable from said sleeve by means of said sliding arm member.

16. The spreader unit of claim 12 wherein said at least one telescopic pipe extends along a longitudinal axis, and wherein said first chamber, said axial passage and said interior cavity of said sliding pipe member are in axial alignment along the longitudinal axis.

17. The spreader unit of claim 12 wherein said first chamber, said axial passage and said interior cavity of said sliding pipe member collectively form a substantially linear fluid flow path for said deicer.

18. A system for spreading deicer on a pavement comprising:
    a vehicle;
    a spreader unit coupled to the vehicle, the spreader unit comprising:
        at least one telescopic pipe comprising a sleeve and a sliding pipe member extractable from an interior cavity of said sleeve, said sliding pipe member comprising a connecting port connectable to a spreader assembly for spreading said deicer, said connecting port in fluid communication with an interior cavity of said sliding pipe member;
        a first seal disposed between an inner surface of said sleeve and an outer surface of said sliding pipe member;
        a second seal disposed between said inner surface of said sleeve and said outer surface of said sliding pipe member;
        said interior cavity of said sleeve being divided into a first chamber and a second chamber by said second seal, said second chamber defined between said first seal and said second seal and between an outer surface of said sliding pipe member and an inner surface of said sleeve, and said first chamber located on an opposite side of said second seal than said second chamber;
        said sleeve comprising an inlet port in said first chamber;
        said second chamber being in fluid communication with said interior of said sliding pipe member via one or more passages in said sliding pipe member;
        said sliding pipe member comprising an axial passage, said interior cavity of said sliding pipe member being in fluid communication with said first chamber via said axial passage; and
    a source of said deicer fluidly coupled to said inlet port.

* * * * *

UNITED STATES PATENT AND TRADEMARK OFFICE
CERTIFICATE OF CORRECTION

PATENT NO. : 8,308,080 B2
APPLICATION NO. : 12/135171
DATED : November 13, 2012
INVENTOR(S) : Enzo Giletta It is certified that error appears in the above-identified patent and that said Letters Patent is hereby corrected as shown below:

Col. 5, Claim 15, line 1, replace -- 13 -- with -- 12 --.

Signed and Sealed this
Nineteenth Day of March, 2013

Teresa Stanek Rea
*Acting Director of the United States Patent and Trademark Office*